(12) United States Patent
Iatan

(10) Patent No.: US 7,682,533 B2
(45) Date of Patent: Mar. 23, 2010

(54) INJECTION MOLDING PROCESS FOR FORMING A RETROREFLECTOR

(75) Inventor: George Iatan, Saint-Lambert (CA)

(73) Assignee: DBM Reflex Enterprises Inc., Laval, Quebec (CA)

( * ) Notice: Subject to any disclaimer, the term of this patent is extended or adjusted under 35 U.S.C. 154(b) by 620 days.

(21) Appl. No.: 10/589,134

(22) PCT Filed: Feb. 11, 2005

(86) PCT No.: PCT/CA2005/000179

§ 371 (c)(1),
(2), (4) Date: Aug. 11, 2006

(87) PCT Pub. No.: WO2005/077636

PCT Pub. Date: Aug. 25, 2005

(65) Prior Publication Data

US 2007/0170608 A1    Jul. 26, 2007

(30) Foreign Application Priority Data

Feb. 11, 2004    (CA) ................................. 2457266

(51) Int. Cl.
  *B29C 45/16* (2006.01)
  *G02B 5/12* (2006.01)
(52) U.S. Cl. .................. 264/1.7; 264/1.9; 264/250; 264/259; 264/294; 264/308
(58) Field of Classification Search .............. 264/1.7, 264/1.9, 250, 259, 294, 308
See application file for complete search history.

(56) References Cited

U.S. PATENT DOCUMENTS

| | | | | |
|---|---|---|---|---|
| 3,409,344 A | * | 11/1968 | Balint et al. ............... 359/531 |
| 3,935,359 A | * | 1/1976 | Rowland ................... 428/172 |
| 4,120,565 A | * | 10/1978 | Rabl et al. ................. 359/836 |
| 5,491,586 A | * | 2/1996 | Phillips .................... 359/530 |
| 5,523,030 A | * | 6/1996 | Kingsbury ................. 264/1.7 |
| 5,780,140 A | * | 7/1998 | Nilsen ...................... 428/172 |
| 5,946,134 A | | 8/1999 | Benson et al. |
| 6,171,095 B1 | | 1/2001 | Balint et al. |
| 6,206,525 B1 | | 3/2001 | Rowland et al. |
| 6,452,653 B1 | | 9/2002 | Yamanaka et al. |

FOREIGN PATENT DOCUMENTS

| | | |
|---|---|---|
| CA | 2 361 048 | 7/2000 |
| DE | 1930291 | 12/1970 |
| JP | 60097301 | 5/1985 |
| JP | 01028794 | 1/1989 |
| JP | 7174910 | 7/1995 |
| JP | 09131733 | 5/1997 |
| JP | 09131733 A * | 5/1997 |

* cited by examiner

*Primary Examiner*—Joseph S Del Sole
*Assistant Examiner*—Timothy Kennedy
(74) *Attorney, Agent, or Firm*—Merchant & Gould P.C.

(57) ABSTRACT

An injection process for forming a retroreflector on a matrix mold having a plurality of prisms that each define a cavity. The process includes the steps of a) injecting a first layer of plastic on the matrix mold for partially filling up each prism up to a predetermined uniform thickness so as to define a recessed portion corresponding with each cavity of the prisms; and b) injecting a second layer of plastic onto of the first layer, the second layer filling up the recessed portion defined in each cavity of the prisms so that second layer defines a flat portion on an exterior side of the second layer.

7 Claims, 4 Drawing Sheets

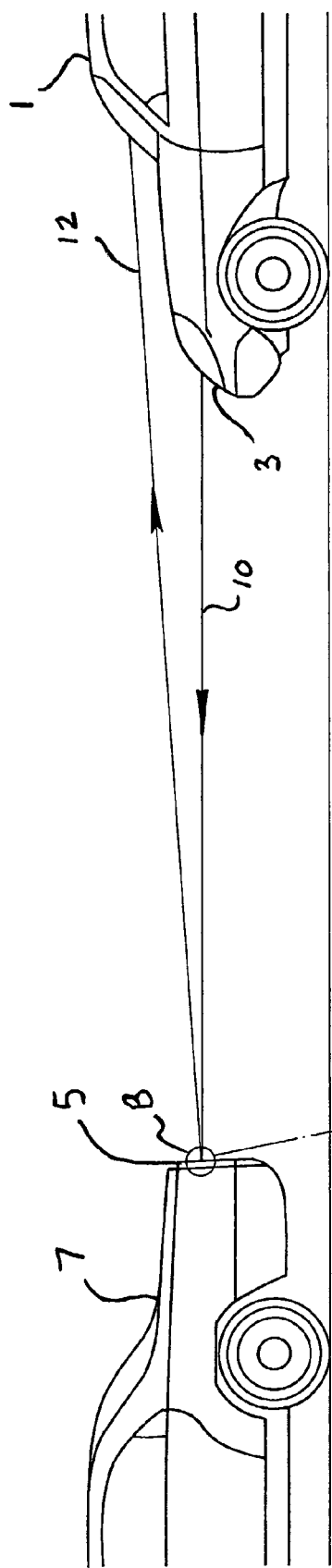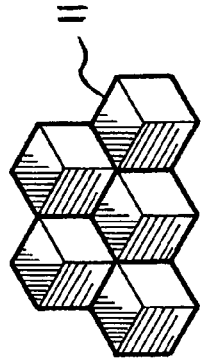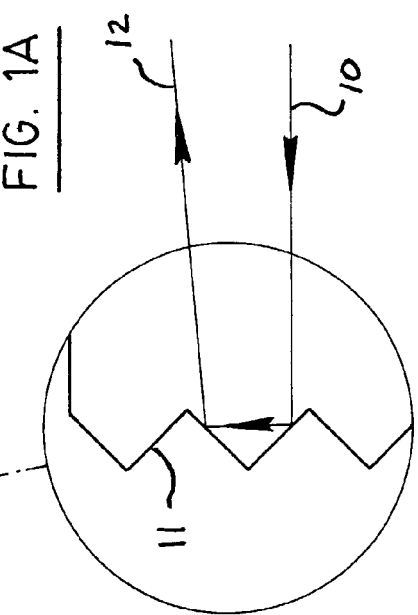

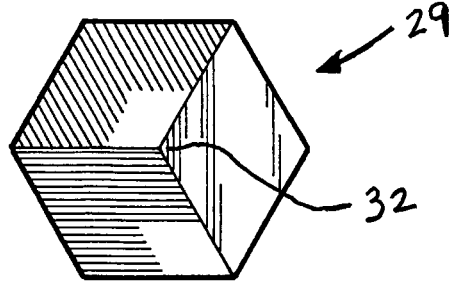
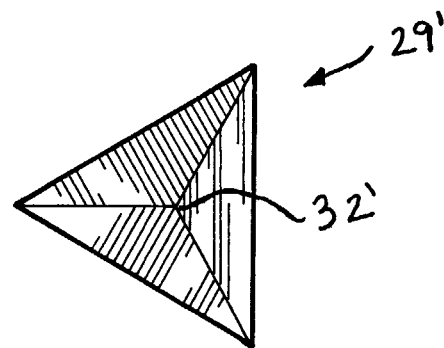
FIG. 4A
FIG. 4B
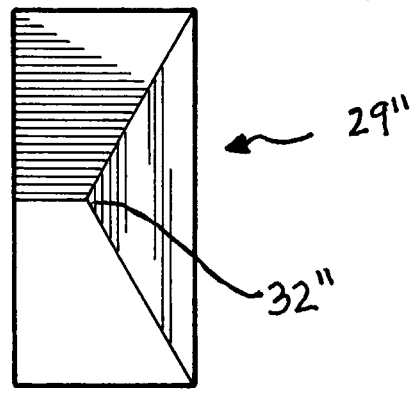
FIG. 4C
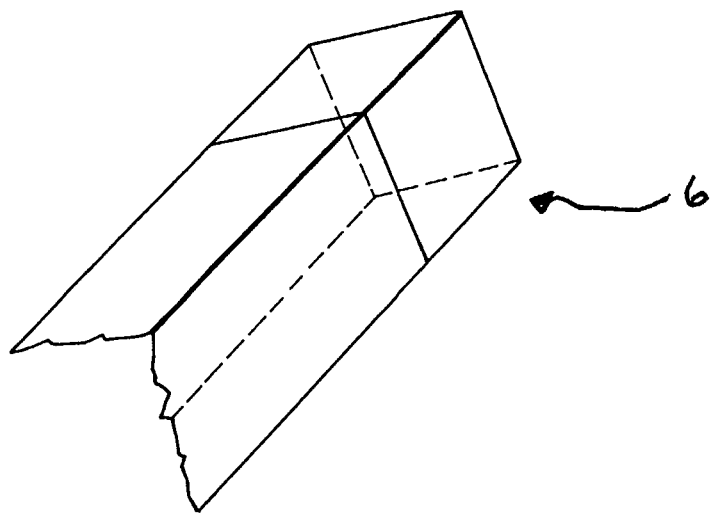
FIG. 5

INJECTION MOLDING PROCESS FOR FORMING A RETROREFLECTOR

FIELD OF THE INVENTION

The present invention relates to an improvement to an injection process for forming retroreflectors, such as those used in automotive vehicles.

BACKGROUND OF THE INVENTION

Conventionally, the outer lens portion of automobile lamp assemblies whether used on the rear, front or side surfaces thereof, have been divided into two or more distinct sections. At least one of these sections includes optical elements which transmit light from a light source in the assembly outwardly thereof and another section made up of reflex elements the purpose of which is to reflect light from an exterior light source directed at the lamp assembly. As is well known, these reflex elements or reflectors are quite useful at night because they can allow drivers to easily spot other vehicles and increase driving safety.

Referring to FIGS. 1A and 1B, there is shown an example of an automobile 1 with its front lights 3 being directed toward the tailgate lights 5 of another automobile 7. As can be seen, an incident beam of light 10 is redirected by a reflector 11 inside the tailgate lights 5 of the second automobile 7 and it comes back towards the driver in the first automobile 3 as a reflected beam of light 12.

Referring to FIG. 1C, the design of the reflectors 11 is based on the retroreflector principle inside plastic prisms, which are typically hexagonal. These reflectors 11 are mandatory in automobile vehicles and their light signal is standardized in various countries. The reflectors 11 are formed by the juxtaposition of prisms of small dimensions, in all the surface of the reflective zone. The side length of each prism is generally inferior to 4 mm.

Referring to FIG. 2, there is shown a portion of a molded plastic retroreflector 13 made according a known plastic injection process that involves injecting a single layer of plastic 9 on a matrix mold made of a multiplicity of prisms. Only one prism 14 is illustrated in FIG. 2 for simplicity. The side length of this prism is shown by distance "d".

The Applicant has discovered that molded reflectors with prisms of more than 4 mm in side length are prone to shrinkage problems. Indeed, shrink marks 15, which are shown in dotted lines in FIG. 2, are created during the cooling of the plastic after the injection step and this affects the reflective properties of the prisms.

As is known in the art, the fabrication of a plastic reflector requires numerous steps. The fabrication by plastic injection on a mold matrix called an electroform first requires the fabrication of metal prisms.

Referring to FIG. 5, the prisms are fabricated from elongated metallic rods 6 that have a geometrical configuration such as a hexagon. At the end of each rod, three faces are machined. These faces are called the reflecting faces and are all symmetrical. The angles of these faces are optimized so as to conform with the standards of light reflections for vehicles. The side length of hexagonal prisms mostly varies between 2 mm to 4 mm. Above 4 mm, these prisms are considered "large prisms".

Once these prisms are fabricated, they are assembled by juxtaposition one next to the other according to a certain configuration that is required by a particular retroreflector. Some optic elements that are non-reflecting can be inserted between them.

Once the assembly of prisms is made, it is deposited in an electrodeposition bath so as to obtain a negative of the geometric configuration. This negative piece is called the electroform or mold matrix.

It is the electroform or mold matrix that is placed in the injection mold. The purpose of the electroform or mold matrix is to permit to the plastic that will be filling the injection mold to take the same shape as the geometric assembly of retroreflector prisms that was made during the previous steps. The plastic is transparent and allows light to travel through it so that the faces of the prisms return light in an opposite direction. The plastic may be made of polymethyl methacrylate or polycarbonate and can have different colors.

The molding parameters are numerous in an injection device. These can be adjusted so as to obtain an esthetically and functionally satisfying piece. In the field of retroreflectors, the goal is to obtain a plastic piece as similar as possible to the metallic prisms that are used to make the electroform or matrix mold.

The shrink marks 15 that on the retroreflector 13 are the result of known problem in the injection process of plastic and are due to a non-uniformity of the thickness of the plastic that is injected. The shrinkage of the piece depends on its thickness and takes places during the cooling of the plastic. In this case, the thickness of the plastic varies between a minimum thickness of "$e_1$" and a maximum thickness of "$e_2$" corresponding to the cavity of the prism, where "$e_2$" is much larger than "$e_1$". Therefore, since the thickness of the plastic is not constant, the faces of the prisms are deformed. It is not possible to maintain a constant thickness on a reflector since one side has to form the geometry of the prisms and the other side has to be flat in order to correctly return the light. The deformation of the faces affects the reflecting properties of the prisms, thus lowering the photometric values of the reflectors. Up to now, one solution to this problem has been to modify certain injection parameters during the injection process in order to mold reflectors up to 4 mm in prism side length.

However, larger prisms that have a side length superior to 4 mm cannot be molded in the conventional manner because of the shrink marks that appear on the reflecting faces. These shrink marks affect the photometric values and do not satisfy the standards. These "large prisms" are more in demand because of the style that they provide. Indeed, the reflex zone does not result in a reflecting surface made of numerous small luminous points, but it is rather made of large luminous points that can be disposed as desired on the lens.

Therefore, there exists in the market a need for an injection process for forming a retroreflector of a larger size but that does not suffer from shrinkage problems that could affect the reflection properties of the prisms. In particular, this process would allow one to mold retroreflector prisms whose side lengths are larger than 4 mm.

SUMMARY OF THE INVENTION

According to the present invention, there is provided an injection process for forming a retroreflector on a matrix mold having a plurality of prisms that each define a cavity, the process comprising the steps of:

a) injecting a first layer of plastic on the matrix mold for partially filling up each prism up to a predetermined uniform thickness so as to define a recessed portion corresponding with each cavity of the prisms; and b) injecting a second layer of plastic onto of the first layer, the second layer filling up the recessed portion defined in each cavity of the prisms so that second layer defines a flat portion on an exterior side of the second layer.

The invention as well as its numerous advantages will be better understood by reading of the following non-restrictive description of preferred embodiments made in reference to the appending drawings.

BRIEF DESCRIPTION OF THE DRAWINGS

FIG. 1A is schematic view of an automobile provided with a prism retroreflector that redirects the light coming from another automobile.

FIG. 1B is an enlarged partial section view of the portion encircled by B in FIG. 1A showing the details of the prism retroreflector.

FIG. 1C is partial a front view of the prism retroreflector shown in FIG. 1B.

FIG. 4A is a top view of a hexagonal prism of a mold matrix that may be used in a process for forming a retroreflector, according to preferred embodiment of the present invention.

FIG. 4B is a top view of a triangular prism of a mold matrix that may be used in a process for forming a retroreflector, according to preferred embodiment of the present invention.

FIG. 4C is a top view of a rectangular prism of a mold matrix that may be used in a process for forming a retroreflector, according to preferred embodiment of the present invention.

FIG. 5 is a perspective partial view of a metal prism that may be used to form a mold matrix of prisms as is known in the art.

DETAILED DESCRIPTION OF THE INVENTION

Figure 2:
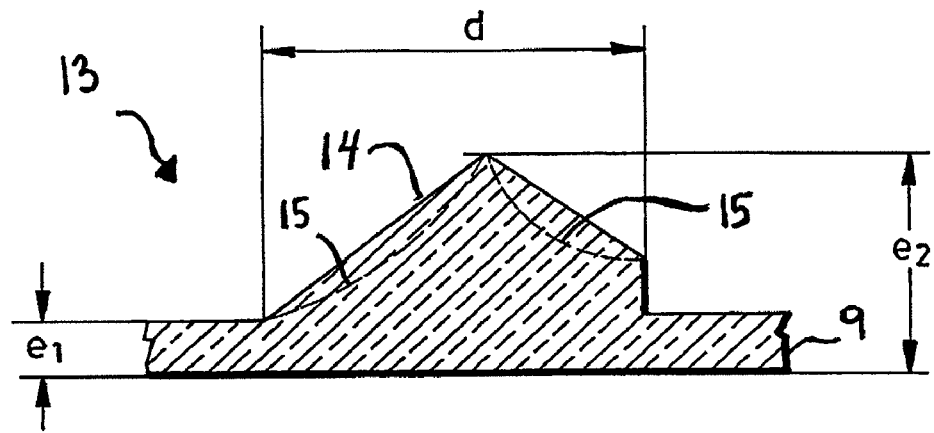
FIG. 2 is a partial cross sectional view of a molded prism retroreflector made according to a known injection process.
Figure 3:
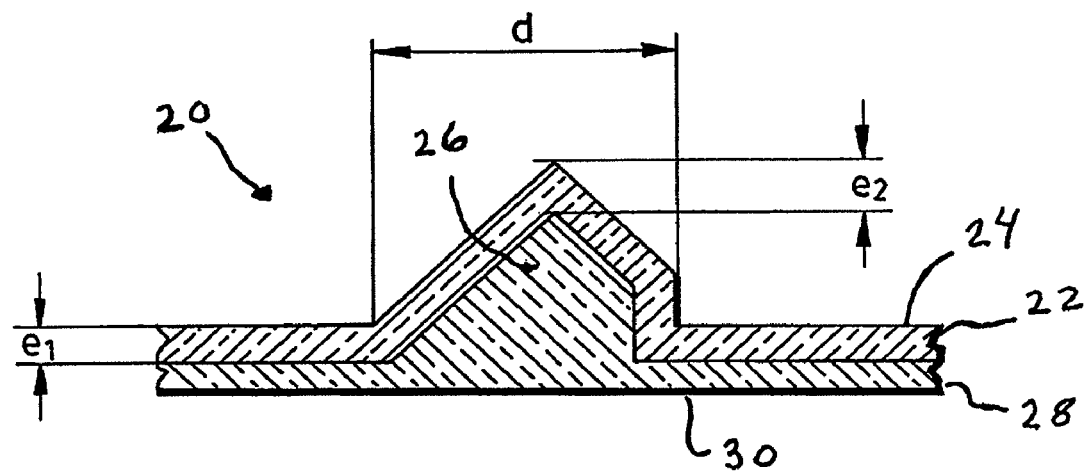
FIG. 3 is a partial cross sectional view of a molded prism retroreflector made according a preferred injection process of the present invention.

Referring to FIG. 3, there is shown an example of a retroreflector 20 that is made by means of an injection process according to a preferred embodiment of the present invention.

Referring to FIG. 4A, the retroreflector 20 is formed on a matrix mold having a plurality of hexagonal prisms 29 that each define a cavity 32. Referring to FIGS. 4B and 4C, it should be noted that the prisms may also take other shapes as those skilled in the art would understand.

Preferably, the injection process according to the present invention includes the steps of:

a) injecting a first layer of plastic 22 on the matrix mold 24 for partially filling up each prism 29 up to a predetermined uniform thickness so as to define a recessed portion 26 corresponding with each cavity 32 of the prisms 29; and b) injecting a second layer of plastic 28 onto of the first layer 24, the second layer 28 filling up the recessed portion 26 defined in each cavity 32 of the prisms 29 so that second layer 28 defines a flat portion 30 on an exterior side of the second layer 28.

As can be appreciated, the first injection molds the form of the retroreflector prisms 29, 29' or 29", which are each provided respectively with a central cavity 32, 32' or 32", as shown for example in FIGS. 4A, 4B and 4C. This process achieves a more uniform thickness of the plastic as compared to the prior art process and therefore minimizes the shrink marks on the faces of the prisms that are created after the cooling of the plastic.

Referring back to FIG. 3, the second layer of plastic 28 is injected onto the recessed portions 26 that remain in the first layer 22 and the second layer of plastic 28 flattens the outer surface of the retroreflector 20. In this way, the incident light coming on the exterior side of the flat portion 30 is reflected properly and is not affected by of the recessed portions 26.

Referring back to FIG. 4A, the geometric shape of the cavities 32 of the prisms 29 is chosen so as to obtain a uniform thickness of the first plastic layer 22 and also to have a correct filling of plastic when injecting the second layer 28. Compared with the prior art process, it is now the second layer 28 which has a substantial variation of thickness, but this layer 28 has very little optic impact and can thus be slightly deformed by shrink marks without affecting the reflection properties of the first layer 22.

Referring to FIGS. 4A, 4B, and 4C, it should be noted that the principle of retroreflection prisms is often associated with hexagonal, triangular or rectangular prisms in the automobile light signal filed. However, the present invention is not limited to only those geometries, but to any prism that is based on the principle of three face total reflection.

Figure 6:
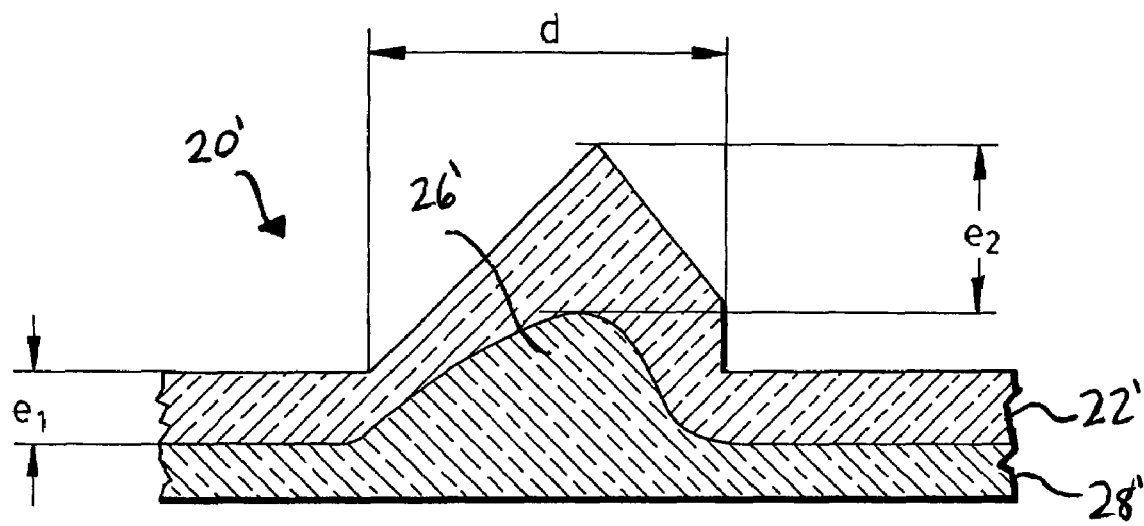
FIG. 6 is a partial cross sectional view of a molded prism retroreflector made according a preferred injection process of the present invention.

It should be noted that the presence of the recessed portions 26 does not necessarily lead to a uniform thickness in the first layer 22 because the recessed portions need to have a geometry that can also allow the proper injection of the second layer 28. Therefore, as shown in FIG. 6, it is preferable that the recessed portion 26' of the retroreflector 20' have the least amount sharp edges and orthogonal walls because these may impede the free flow of plastic when injecting the second layer 28'. A tradeoff thus needs to be achieved with regard to the geometry of the recessed portions 26, 26' in order to minimize the thickness differences in the first layer 22, 22' and to allow the second layer 28, 28' to be correctly injected and to fill all gaps without trapping air bubbles in the center of the recessed portions 26, 26'. The interface between the first layer 22, 22' and second layer 28, 28' should be free of air bubbles in order to avoid unwanted deviations in the light beams.

A preferred object of the present invention is to be able to create large prisms in retroreflectors for automobile lenses and any other vehicles. This large prisms have the advantage of creating large luminous spots instead of the known reflecting surfaces that are a juxtaposition of small luminous spots.

A distinctive advantage of the present invention is that, contrary to the conventional process of injection that is made in one step, it is made in at least two steps which allow a better control of the geometry of the first layer and produces large prisms without shrink marks on the reflecting surfaces.

Preferably, the process according to the present invention relates to the injection of transparent plastic retroreflectors that are mainly used in light signals. Such retroreflectors are based on the principle of retrereflection on three faces that are oriented as a pyramid.

It should be noted that the process according to the present invention may be used for injecting prisms which side lengths are larger than 4 mm. Below 4 mm, the shrinkage problem that the present invention eliminates becomes negligible. Some test have been carried out with success with prisms of up to 8 mm. However, this process has its limits because as the size of the prism is increased, the second layer will create an ever greater aesthetic deformation because of the depth of the recessed portion that needs to be filled up. This problems may be avoided for larger and larger prisms by proceeding with a three step injection process similar to what was described above.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

The invention claimed is:

1. An injection process for forming a retroreflector including a plurality of prisms each having three reflective optical surfaces oriented as a pyramid wherein all of the plurality of prisms are attached to a common support in the form of flat portion of the reflector, the injection process occurring on a matrix mold having a plurality of prisms that each define a mold cavity, the process comprising the steps of:
    a) injecting a first layer of plastic on the matrix mold for partially filling up each prism shaped mold cavity to form simultaneously the three reflective optical surfaces free of shrink marks and a first layer of the flat portion up to a predetermined substantially uniform thickness so as to further define a recessed portion corresponding with each said cavity of the prisms; and
    b) injecting a second layer of plastic in the matrix mold cavity and onto the first layer, the second layer including a prism portion inside the three reflective optical surfaces filling up the recessed portion defined in each cavity of the prisms so that second layer takes the shape of the recessed portion and said second plastic further defines outside the recessed portion a second layer of the flat portion on an exterior side of the first layer.

2. The injection process according to claim 1, wherein each prism has a side length larger or equal to 4 mm.

3. The injection process according to claim 2, wherein each prism has a side length ranging from 4 mm to 8 mm.

4. The injection process according to claim 1, wherein each prism has a hexagonal shape.

5. The injection process according to claim 1, wherein each prism has a rectangular shape.

6. The injection process according to claim 1, wherein each prism has a triangular shape.

7. The injection process according to claim 1, further comprising the step of injecting an intermediate layer of plastic after step a) and before step b).

* * * * *